A. M. SMITH.
CUSHION TIRE.
APPLICATION FILED JULY 27, 1912.

1,050,861.

Patented Jan. 21, 1913.

2 SHEETS—SHEET 1.

Witnesses
Jos. T. Collins
B. J. Bridges

Inventor,
Andrew M. Smith,
By Davis & Davis
Attorneys

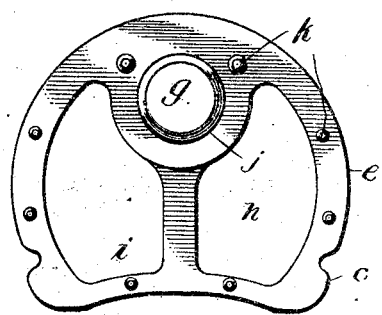
Fig. 4.
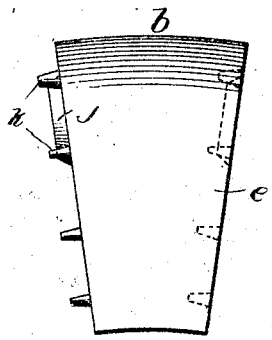
Fig. 5.
Fig. 6.
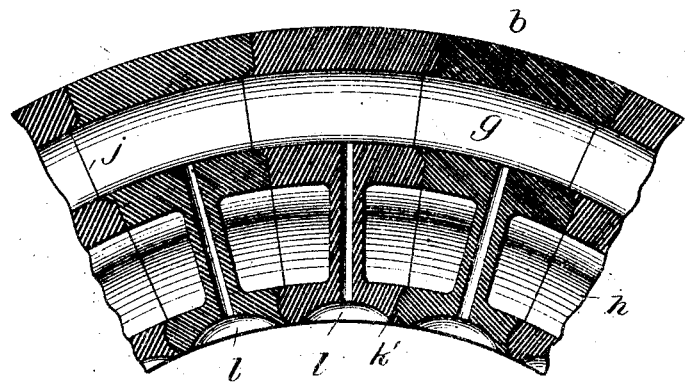
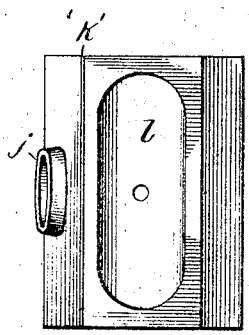
Fig. 7.

UNITED STATES PATENT OFFICE.

ANDREW MINETREE SMITH, OF PETERSBURG, VIRGINIA.

CUSHION-TIRE.

1,050,861.

Specification of Letters Patent. Patented Jan. 21, 1913.

Application filed July 27, 1912. Serial No. 711,865.

*To all whom it may concern:*

Be it known that I, ANDREW MINETREE SMITH, a citizen of the United States of America, and a resident of Petersburg, county of Dinwiddie, State of Virginia, have invented certain new and useful Improvements in Cushion-Tires, of which the following is a full and clear specification, reference being had to the accompanying drawings, in which—

Figure 1:
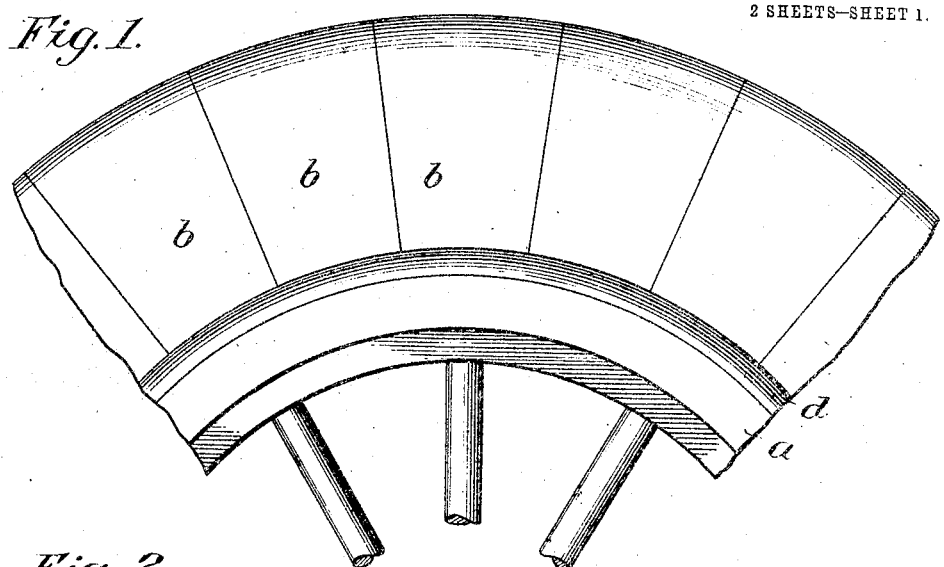
Figure 2:
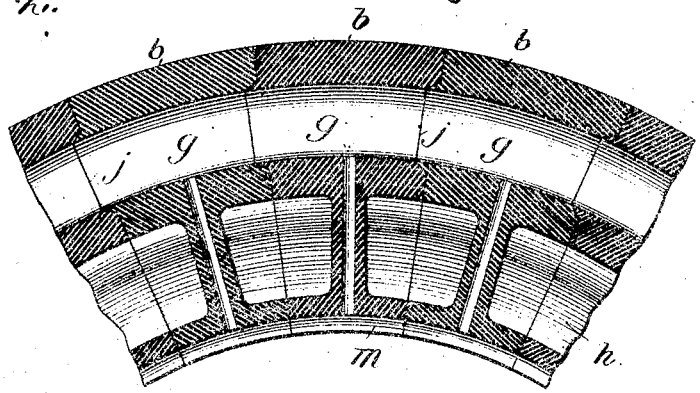
Figure 3:
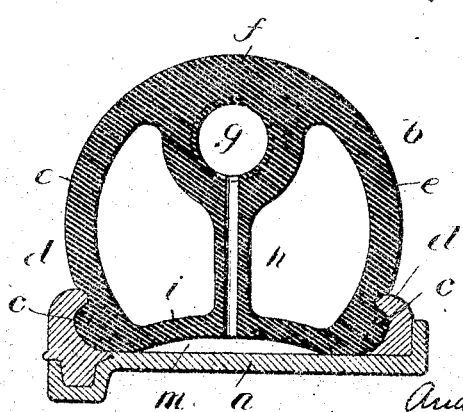

Figure 1 is a side elevation of a portion of a wheel rim provided with my tire; Fig. 2 is a longitudinal section of a part of the tire; Fig. 3 is a transverse section thereof; Figs. 4 and 5 are detail views of one of the segments; Fig. 6 is a longitudinal section showing a slightly modified form; and, Fig. 7 is a bottom view of one of the segments employed in this modified form.

This invention has relation to that class of resilient tires having the qualities of a pneumatic tire without the disadvantages thereof and constructed of resilient segments separably interlocked with each other so as to be capable of independent insertion and removal.

The object of the present invention is to avoid the damages and delays of punctures and blow-outs by providing a double air-cushion whereby when the main cushion is overcome by impact or weight the auxiliary cushion comes into action so that under all circumstances there will be one or more cushions in action, thereby contributing to the safety of life and property.

In the drawings, $a$ designates a rim of any suitable construction and $b$ designates the segments of the tire attached thereto, each segment being provided with outwardly projecting beads or flanges $c$ at its inner corners, which beads or flanges fit under the inwardly-turned curved or rolled edges $d$ of the tire rim or shoe. Each segment is provided with resilient walls $e$ and with a thickened tread wall $f$ through which extends a passage $g$. The thickened part of the tread wall bulges inwardly and is integrally connected by a column or post $h$ to the bottom wall or foot $i$ of the segment. The column or post $h$ is preferably hollow to increase the strength and resiliency of the segment, and in order that the pressure on the tread of the tire shall assist in securely interlocking the segment with the curved flanges $d$ the bottom wall is slightly bent or arched upwardly at its center so that the pressure will be transmitted through the column $h$ to the upper side of the arch and thus exert an outward pressure on the feet of the segment and force the beads or flanges $c$ in under the hooks $d$. It will be observed that when these segments are placed side by side on the rim with their adjacent faces closely abutting, the holes $g$ will form a continuous space around the tire near the tread portion thereof. This continuous space will form an auxiliary cushion in that it will not be brought into complete action until the walls $e$ of the main cushion are collapsed by reason of some exceptional jar or impact. It will be observed also that the outer walls $e$ and the bottom wall $i$ and the wall of the thickened portion of the tread form a comparatively large annular space, which space and walls form the main cushion of the tire which is in action alone except in the special case above noted, namely where the jar or impact is sufficiently great to collapse the side walls and the central series of supporting columns and thus bring into action the supplemental cushion. It will be observed that the columns $h$ are narrower than the widths of the segments so that they do not serve to divide up the main cushion air-space but permit a free circulation of air all around them. It is not intended that the joints between the segments shall be air-tight; on the contrary it is intended that air shall circulate at atmospheric pressure throughout all the spaces of the tire, it being the object of the present invention to avoid the necessity of using an inner tube and to rely wholly on the resiliency of the material disposed in the manner shown and described. Of course the joints are sufficiently tight to exclude dirt and mud and water.

It is desirable that some means shall be provided for alining the segments and holding them in alinement during severe action. I prefer doing this by providing each segment at one end with an annular beveled flange $j$ and at its opposite edge with a similarly shaped recess so that when the segments are put together the flange on one segment will enter the recess formed on the adjacent segment. The flanges $j$ surround the openings $g$ in the segments. As an additional means for this purpose I may provide each of the segments with pins $k$ on one face and with corresponding recesses in its opposite face, as shown in Figs. 4 and 5; and as shown in Fig. 6 I may provide the side edges of the feet of the segments with convexed faces $k'$ which shall fit into similarly shaped concavities in the adjacent segment. As shown in Fig. 6, I may dish the bottom wall of each segment so that there will be formed around the rim a series of pockets $l$ instead of an annular space $m$ shown in the other figures. In each case the pressure of the column $h$ on the bottom wall of each segment will (in the manner herein set forth) cause an interlocking action between the outer edges of the segments and the curved in edges of the shoe or rim.

Having thus described my invention, what I claim as new and desire to secure by Letters Patent, is—

1. A vehicle tire constructed of resilient material and having two annular air spaces one nearer the rim than the other and normally separated from each other by independently yieldable walls, said tire being constructed of transverse abutting sections independently removable, the adjacent faces of these abutting sections being provided with interlocking projections and recesses, each section being provided with a resilient upwardly curved bottom wall and a resilient portion connecting the center of this bottom wall to the wall below the annular air space nearest the tread portion of the tire, and a tire rim for holding said sections in abutting relation.

2. A vehicle tire constructed of resilient material and having two annular air spaces one nearer the rim than the other and normally separated from each other by independently yieldable walls, said tire being constructed of transverse abutting sections independently removable, the adjacent faces of these abutting sections being provided with interlocking projections and recesses, one of the projections surrounding the outer annular air space and the other projections being located at either side thereof, for the purpose set forth.

In testimony whereof I hereunto affix my signature in the presence of two witnesses.

ANDREW MINETREE SMITH.

Witnesses:
  ROBERT G. BASS,
  RICHARD H. MANN.